United States Patent
Kilgard et al.

(10) Patent No.: US 7,355,602 B1
(45) Date of Patent: Apr. 8, 2008

(54) SURROGATE STENCIL BUFFER CLEARING

(75) Inventors: Mark J. Kilgard, Austin, TX (US);
Jonah M. Alben, San Jose, CA (US);
Cass W. Everitt, Round Rock, TX (US)

(73) Assignee: NVIDIA Corporation, Santa Clara, CA (US)

( * ) Notice: Subject to any disclaimer, the term of this patent is extended or adjusted under 35 U.S.C. 154(b) by 492 days.

(21) Appl. No.: 10/985,699

(22) Filed: Nov. 10, 2004

(51) Int. Cl.
*G09G 5/36* (2006.01)
(52) U.S. Cl. .................. 345/559; 345/530
(58) Field of Classification Search ............ 345/558, 345/422, 619, 530, 548, 559
See application file for complete search history.

(56) References Cited

U.S. PATENT DOCUMENTS 5,394,170 A * 2/1995 Akeley et al. ............ 345/556
5,805,868 A * 9/1998 Murphy .................... 345/502
6,778,189 B1 8/2004 Kilgard

OTHER PUBLICATIONS

Kilgard, Mark J., "Improving Shadows and Reflections via the Stencil Buffer", Aug. 9, 2003, http://www.physics.utah.edu/~zona/cs6610/stencil.pdf.*

* cited by examiner

*Primary Examiner*—Xiao Wu
*Assistant Examiner*—David Lin
(74) *Attorney, Agent, or Firm*—Patterson & Sheridan, L.L.P.

(57) ABSTRACT

Methods and apparatuses for effectively clearing stencil buffers at high speed using surrogate stencil buffer clearing. A hardware register tracks the number of surrogate clears of the stencil buffer since the last actual clear. Bits are reserved in each stencil register for storing the surrogate clear number that cleared other stencil registers the last time the stencil register held an assigned value. A comparison between the contents of the hardware register and the reserved bits in each stencil register determines if each stencil register should be assigned a cleared value. If the numbers do not match the stencil register is assigned a predetermined surrogate clear value. In some applications the number of reserved bits is fixed, while in other applications the number of reserved bits can be set, either by a designer or by software.

17 Claims, 6 Drawing Sheets

SURROGATE STENCIL BUFFER CLEARING

BACKGROUND OF THE INVENTION

1. Field of the Invention

This invention relates to graphic systems. More particularly, this invention relates to fast, efficient stencil buffer clearing.

2. Description of the Related Art

Graphics processing is an important feature of modern high-performance computing systems. In graphic processing, mathematical procedures are implemented to render, or draw, graphic primitives, e.g., triangles or rectangles, on a display to produce desired visual images. Real time graphics processing is based on the high-speed processing of graphic primitives to produce visually pleasing moving images.

Early graphic systems were limited to displaying image objects comprised of graphic primitives without proper shadowing. Adding the casting of shadows provides more realism than present in early images. To enhance image quality, shadow generation techniques such as stenciled shadow volumes were introduced to add realistic shadows to rendered images. The stenciled shadow volume technique depends on the use of a stencil buffer, described in more detail subsequently. Similarly, other rendering techniques such as for Constructive Solid Geometry depend on the stencil buffer.

Graphics are typically designed by graphics designers who use application program interfaces (APIs), which are standardized software interfaces, to render desired images that can be run on multiple platforms, operating systems, and hardware. Examples of APIs include the Open Graphics Library (OpenGL®) and D3D™. This enables graphic designers to design graphics without knowing any of the specifics regarding the system hardware or how their commands will be implemented. Application program interfaces (APIs) are widely accepted, powerful, and are good vehicles for implementing features such as those of the present invention.

When a graphics image is rendered each pixel of that image is given a set of values that are stored in buffer memory and that are used to "display" the pixel. For example, each pixel can have a color value that is stored in a color buffer and a depth value that is stored in a depth (Z) buffer memory.

In addition to color and depth buffer memories, each pixel can also have an entry in a stencil buffer. A stencil buffer is a memory comprised of stencil registers that can control the update of a pixel. Typical uses of stencil buffers include defining regions for masking pixel updates, constructive solid geometry, and adding shadows. For example, if portions of a "background" are to show through windows, the stencil registers for the background that will show can be given values while the stencil registers for other areas can be cleared. The value of the stencil registers can then be compared to a threshold value and used to mask-out areas that are not to show through (or mask-in the areas that are).

As previously noted a stencil buffer can also be used to add shadows. Shadows can enhance an image by producing a more natural-looking image. Since graphic shadows correspond to real world shadows, graphic shadows represent the effects of shading caused by surfaces that block light. Since a given image may have both multiple light sources and multiple light-blocking surfaces the shadow value of each pixel depends on the shading produced by all of the light sources and all of the light-blocking surfaces. Images with convincing shadows can be produced using one or more shadow algorithms that store values in a stencil buffer. Most shadow algorithms "turn off" the light sources, determine a base shadow value for each pixel, then selectively turn on the individual light sources, determine the shadow value produced by each light source, and then blend the result to produce a composite shadow value for each pixel.

The foregoing overview has been presented in a simplified manner for clarity. Implementing the foregoing is often performed using graphics design packages. Such packages enable a graphics designer to specify numerous editing and formatting attributes, including shadow algorithms and other uses of the stencil buffer.

When using a stencil buffer, such as when implementing a shadow algorithm, it is typically necessary to first clear the stencil registers. For example, when determining the effects of light sources on the stencil value of each pixel it is typically necessary to clear the stencil buffer multiple times, e.g., once for each light source. By clearing it is meant setting the value of cleared stencil registers to some predetermined value, often, but not always, 00hex. While clearing a stencil register is not particularly difficult, say by writing a predetermined value to each stencil register, writing that value to each stencil register is a fairly slow process given that millions of stencil registers might exist. Having to do so multiple times, such as when shadow rendering, can become excessively time consuming.

Additionally, stencil-only frame buffer clears are increasingly common as 3D applications are now using rendering algorithms such as stenciled shadow volume rendering for multiple light sources in a single frame, recent "soft" stenciled shadow volume techniques, and stencil-based constructive solid geometry techniques. In such algorithms there are multiple stencil buffer clears for each depth buffer clear. Additionally in many cases, these algorithms often do not require all 8 stencil bitplanes for their stencil requirements. In such cases, there is the potential for using some of the stencil register bitplanes for other purposes.

In view of the foregoing, a method of effectively clearing stencil registers at high speed would be beneficial. Also beneficial would be methods of enabling a graphics designer to control the clearing of stencil registers such that the use of the stencil buffer is not negatively impacted. Also beneficial would be a high speed system and method for effectively clearing stencil registers such that numerical algorithms that use the stencil buffer are not negatively impacted.

SUMMARY OF THE INVENTION

The principles of the present invention provide for new, useful, and non-obvious methods and apparatuses for effectively clearing stencil registers at high speed. Embodiments of the present invention provide for high speed clearing of stencil buffers using surrogate stencil buffer clearing. Surrogate stencil buffer clearing uses a hardware register to track the number of surrogate clears since the last actual clear. Reserved bits in the stencil registers store the number of the surrogate clear when the stencil register was last written. When reading a stencil register, a comparison is between the current contents of the hardware register and the reserved bits in each stencil register to determine if that stencil register should be assigned a surrogate clear value.

The principles of the present invention provide for new, useful, and non-obvious methods and apparatuses for controlled surrogate clearing of stencil registers. Embodiments of the present invention enable controlled surrogate clearing by fixing the number of reserved bits in the stencil registers.

The number of reserved bits can be set by hardwiring the number of bits, by enabling a designer to set the number of reserved bits, or automatically by setting bits based on a running algorithm. Beneficial surrogate stencil buffer clearing enables high speed clearing of stencil registers such that numerical algorithms that use the stencil buffer memory are not negatively impacted.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The principles of the present invention provide for new, useful, and non-obvious methods and apparatuses for effectively clearing stencil buffers. Such clearing can be done at high speed by incorporating surrogate stencil buffer clearing. To understand surrogate stencil buffer clearing it may be helpful to understand the stencil buffer's position within the overall framework of a computer system.

Figure 1:
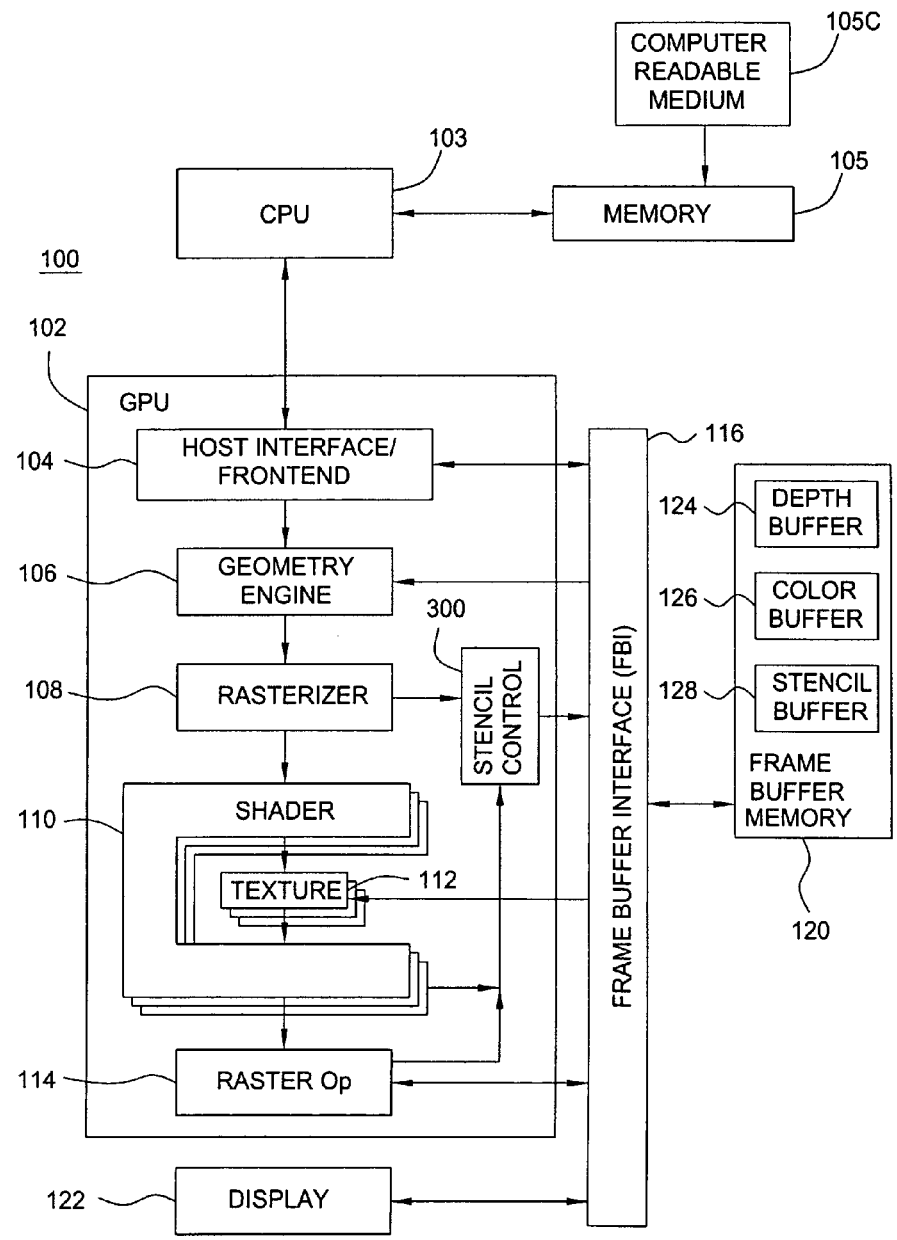
FIG. 1 illustrates a computer system that incorporates the principles of the present invention.

FIG. 1 illustrates a simplified block diagram of a computer system 100 that is in accord with the principles of the present invention. The computer system 100 includes a graphics processing unit 102 integrated circuit having a host interface/front end 104. The host interface/front end 104 receives raw graphics data and program instructions from a central processing unit 103 that is running an application program that is stored in a memory 105. That application program, which can be input from a computer readable medium 105C causes the computer system to implement the principles of the present invention. The host interface/front end 104 buffers input information and supplies raw graphic information to a geometry engine 106. The geometry engine has access to a frame buffer memory 120 via a frame buffer interface 116. The geometry engine 106 produces, scales, rotates, and projects three-dimensional vertices of graphics primitives in "model" coordinates that are stored in the frame buffer memory 120 into two-dimensional frame-buffer coordinates. Typically, triangles are used as graphics primitives for three-dimensional objects, but rectangles are often used for 2-dimensional objects (such as text displays). It should be understood that the frame buffer memory can be either a memory dedicated to the graphics system or part of the system memory.

The frame buffer memory 120 includes various identifiable buffers, including a depth buffer 124 for storing depth information for each pixel, a color buffer 126 for storing color information for each pixel, and a stencil buffer memory 128 having a stencil register for each pixel. Uses of the stencil buffer memory 128 have been previously described (see the Background of the Invention). However, for purposes of illustration, it will be assumed that the application program in memory 105 implements a shadow render routine that uses the stencil buffer 128.

Returning to FIG. 1, the two-dimensional frame-buffer coordinates of the vertices of the graphics primitives from the geometry engine 106 are passed to a rasterizer 108. The rasterizer 108 identifies the positions of all of the pixels within the graphics primitives. This is typically performed along raster (horizontal) lines that extend between the lines that define the graphics primitives. The output of the rasterizer 108 is referred to as rasterized pixel data.

The rasterized pixel data are applied to a shader 110 that processes input data (code, position, texture, conditions, constants, etc) using a shader program (sequence of instructions) to generate output data. Shaders can be considered as a collection of processing capabilities that can handle large amounts of data at the same time, such as by parallel processing data.

The shader 110 includes a texture engine 112 that modifies the rasterized pixel data to have the desired texture and visual features. The texture engine 112, which has access to the data stored in the frame buffer memory 120, can be implemented using a hardware pipeline that processes large amounts of data at very high speed. The shaded pixel data is then sent to a Raster Operations Processor 114 (Raster op in FIG. 1) that optionally performs additional processing on the shaded pixel data including stencil processing. The end result is pixel data that is stored in the frame buffer memory 120 by the frame buffer interface 116. The frame pixel data can be used for various processes such as displaying an image on a display 122.

Stencil registers in the stencil buffer 128 are typically 8-bits wide because that is the almost universal width of low-cost memories. While the principles of the present invention do not depend on 8-bit wide registers (other widths work just as well), the present invention will be explained using an assumed 8-bit-wide stencil registers. In practice all 8-bits of a stencil register are not often used because most stencil operations can be performed with fewer bits. In fact, some stencil operations need only one bit. The present invention makes use of otherwise unused stencil register bits to implement surrogate stencil buffer clearing.

Figure 2:
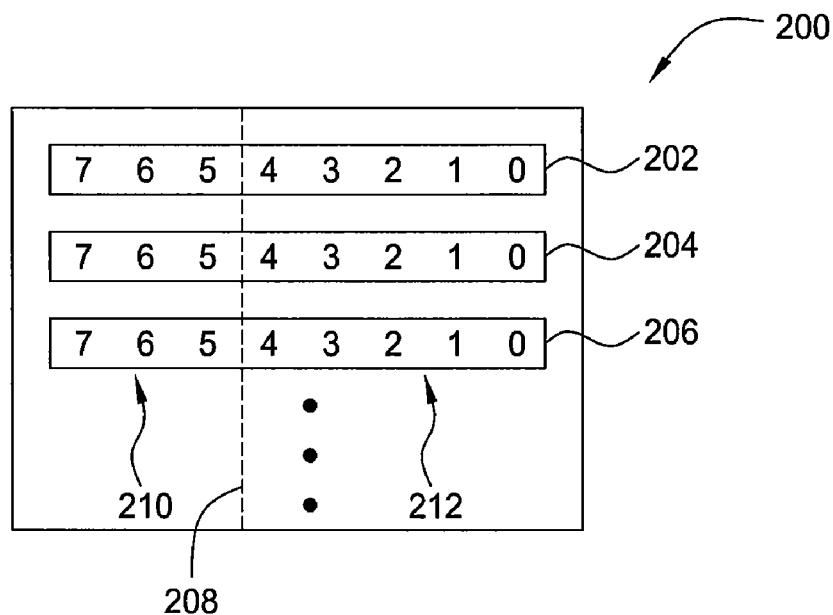
FIG. 2 schematically illustrates a portion of a stencil buffer that is in accord with the principles of the present invention.

FIG. 2 illustrates a small portion 200 of the stencil buffer 128 (shown in FIG. 1) when a shadowing render routine is running. As shown, the stencil buffer 128 includes a plurality of stencil registers, the registers 202, 204, and 206. While the portion 200 shows three stencil registers, in practice a stencil buffer 128 can have millions of registers. As noted, each stencil register is 8 bits wide, with the bits being labeled 7 (most significant bit) to 0 (least significant bit). FIG. 2 also illustrates a functional partition 208 that divides each stencil register into bit groups. The bit group to the left of partition 208 (bits 7-5) is referred to herein as the stencil clear group 210, while the bit group to the right is referred to herein as the stencil value group 212.

Figure 3:
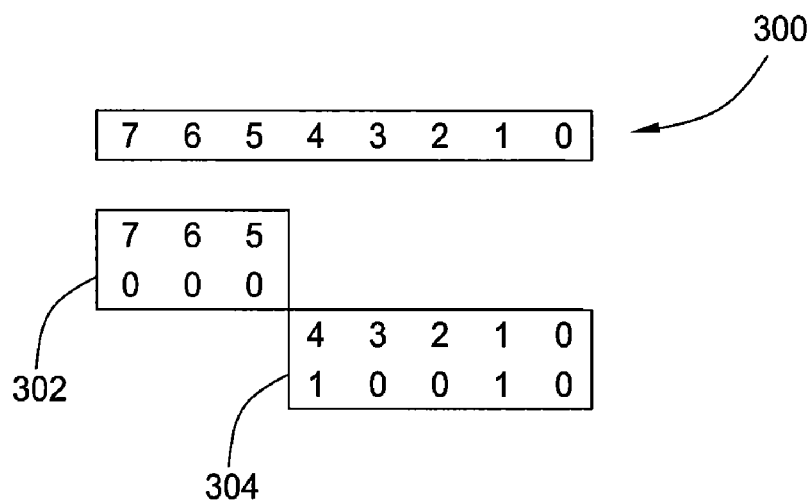
FIG. 3 illustrates a stencil control register that is in accord with the principles of the present invention.

As implemented in the computer system 100 surrogate stencil buffer clearing uses a special stencil control register 300, which is a dedicated hardware register built into the graphic processing unit 102. An example of the stencil control register 300, assumed for the moment to be 8-bits wide, is shown in FIG. 3. The stencil control register 300 is also divided into two groups. The first group is referred to as the clear group 302 while the second group is referred to as the surrogate clear group 304.

Surrogate stencil buffer clearing uses the stencil control register 300 as a substitute for actually clearing the stencil registers. This is beneficial because actually clearing the possibly millions of stencil registers can take an excessive amount of time and memory bandwidth. By reducing the number of actual clears much of that otherwise wasted time and memory bandwidth can be saved. The values stored in the stencil clear groups 210 are used to determine or identify which stencil registers the stencil control register 300 is to substitute for. Ultimately, these reductions improve the overall rendering rate and can reduce power consumption by reducing the memory transactions needed for actual clears.

Figure 4:
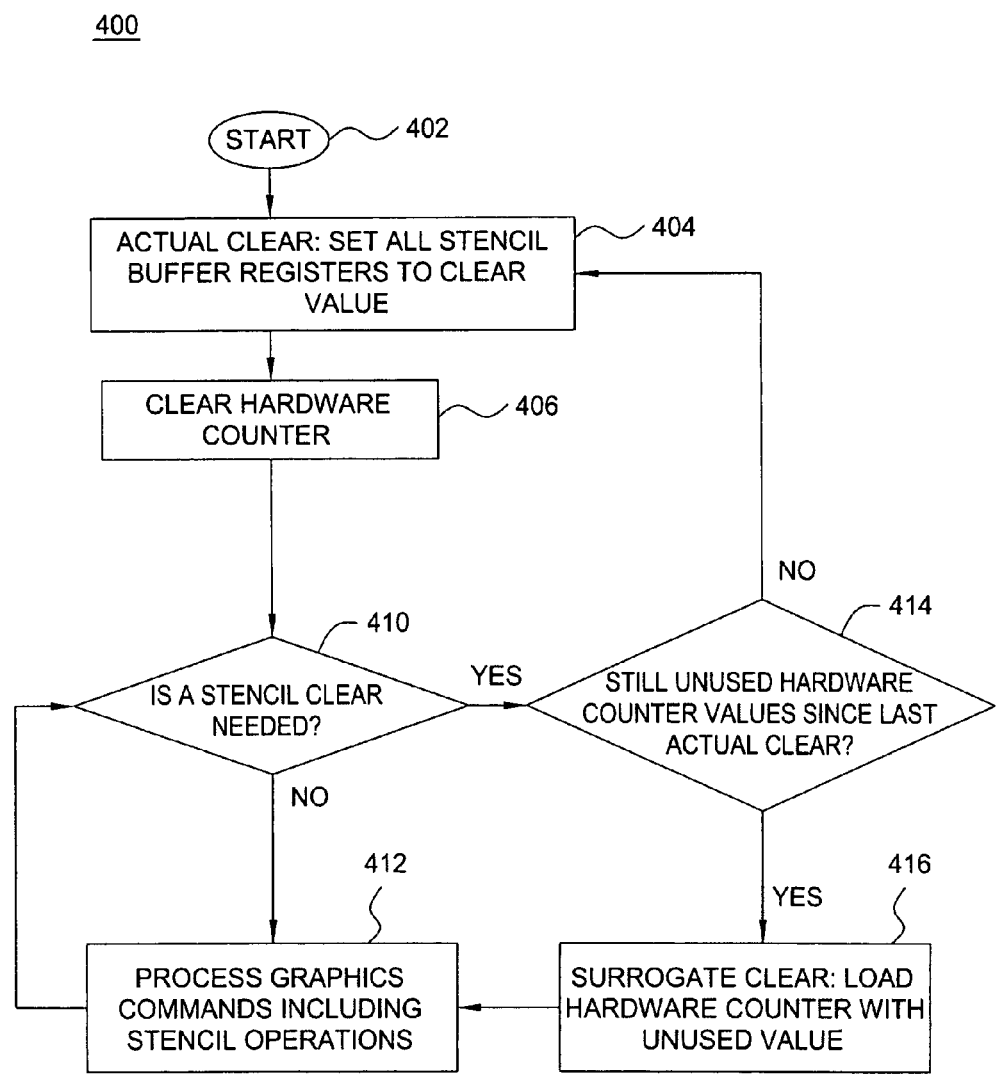
FIG. 4 illustrates a method of operating the computer system illustrated in FIG. 1.

Surrogate stencil buffer clearing is probably best explained by example; reference FIG. 4 for an illustrated method 400. As shown, the method 400 starts at step 402 and proceeds at step 404 by performing an actual clear of the stencil registers. An actual clear is performed by writing a clear value into each stencil register. Typically, but not always, the clear value will be all zeros (00hex). At this time, all of the stencil registers store the written clear value.

After step 404, the method 400 proceeds to step 406 where the stencil control register 300 is cleared (set to zero). The stencil control register 300 forms a hardware counter in the clear group 302. Thus, the stencil control register 300 forms a hardware counter using some bits (the clear group) and a register for holding the surrogate clear value in the remaining bits (the surrogate clear group).

Next at step 410 a determination is made as to whether a stencil clear is needed. For example, during shadow rendering some pixels will be updated and some will not be. If a stencil clear is not required, the process proceeds to step 412 where graphic commands, including stencil operations, are performed. The step of processing graphic commands includes a step of stopping the processes illustrated in FIG. 4.

However, if at step 410 the determination is that a stencil clear is needed; at step 414 a determination is made as to whether there are still unused counter values in the hardware counter in the clear group 302. That is, is it time for an actual clear? To determine this, the value of the hardware counter is increased, possibly by a simple increment. Then, a determination is made as to whether the content of the hardware counter has reached a predetermined value. That is, is the increased value in the hardware counter in step 412 at some threshold, typically the maximum value of the counter's range. If so, the method 400 loops back to step 404 and an actual clear is performed on all of the stencil registers.

But, if a stencil clear is needed, but it is not time for an actual clear of the stencil registers, from step 414 the processes proceeds to step 416 where the surrogate clear group of the stencil control register 300 is loaded with an unused value. That value will be used as the new value of the clear group 302. Then, the process proceeds to step 412 where graphics commands are performed.

One view of the content of the clear group is that is holds generational information. Each generation being the use of a surrogate clear since the last time the stencil register was actually cleared. For example, the first surrogate clear results in 1 in the clear group 210 of the stencil registers impacted by ongoing operations, the next pass will place a 2 in the clear groups 210 that are being impacted by the new operations, and so on.

Figure 5:
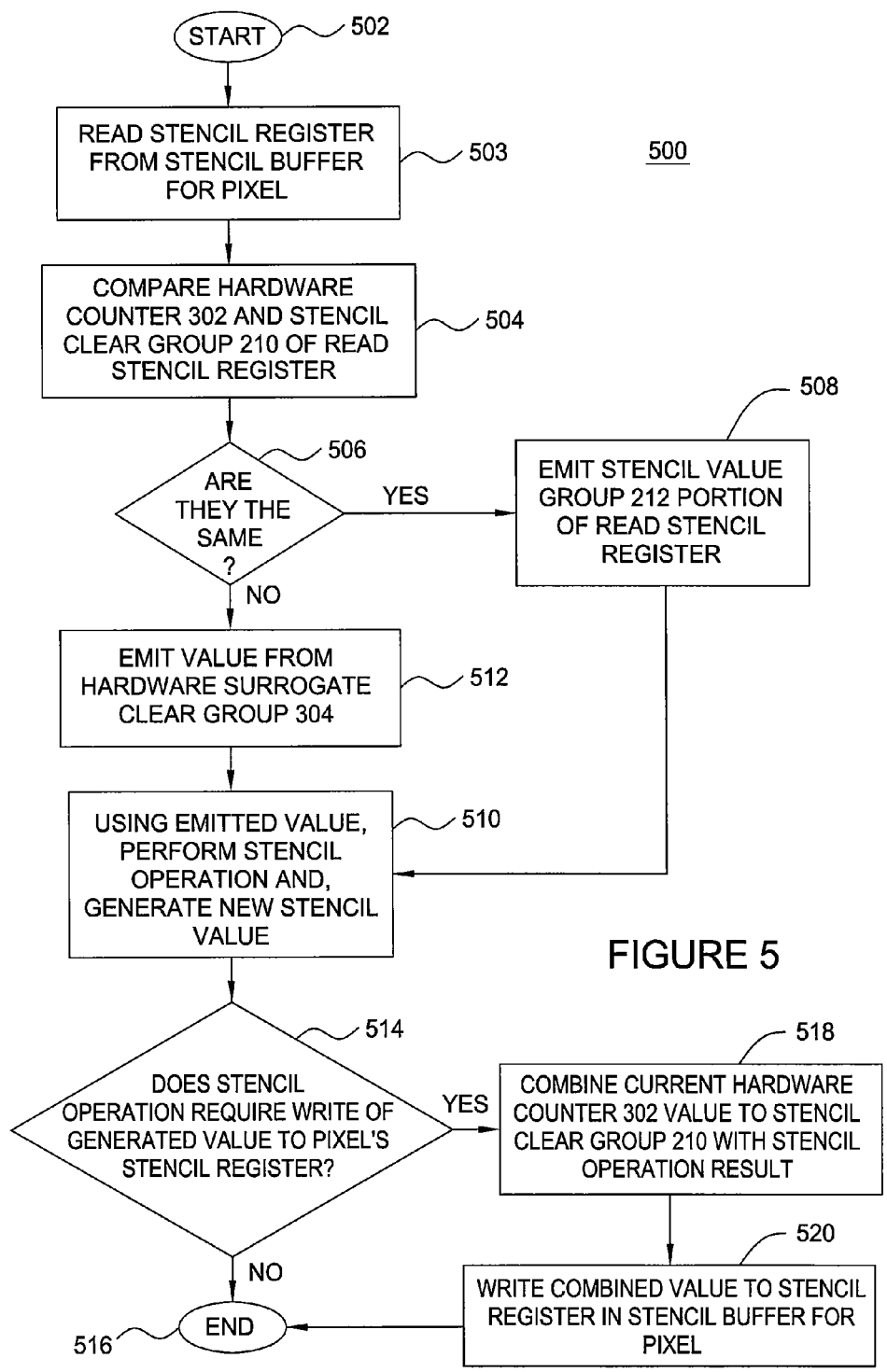
FIG. 5 illustrates steps when performing step 414 of FIG. 4.

A method 500 of selectively using surrogate clearing is illustrated in FIG. 5. The method 500 starts at 502 and proceeds to step 503 where a read is performed (from the stencil buffer) of a stencil register of a pixel. Then, at step 504 a comparison is made between the hardware counter value (in clear group 302) and the stencil clear group 210 of the stencil register read in step 503. If at step 506 it is found that the hardware counter value and the stencil clear group 210 of the stencil register are the same, the method proceeds to step 508. At step 508 the stencil value in the stencil register is emitted (sent to a graphics processing operation). This step is performed if the stencil value in the stencil register is to be used in the graphic operation being performed (no surrogate stencil clearing). The method then proceeds to step 510 where the emitted stencil value is used to perform a stencil operation and where a new stencil value may be generated.

However, if at step 506 it is found that the hardware counter value and the stencil clear group 210 of the stencil register are not the same, the value in the surrogate clear group 304 is emitted. This step is performed if a surrogate clear is to be used for the associated pixel. The method then proceeds to step 510 where the emitted stencil value (here that of the surrogate clear) is used to perform a stencil operation and where a new stencil value may be generated.

After step 510 a determination is made at step 514 as to whether the stencil operation that was performed requires a WRITE of the generated value to the associated pixel's stencil register. If not, the method ends for the associated pixel, but the method will repeat for all pixels of interest.

However, if the determination at step 514 is that the stencil operation that was performed requires a WRITE of the generated value to the associated pixel's stencil register, the process proceeds to step 518. At step 518 the current hardware counter value is combined (joined bitwise) with the result of the stencil operation, and then at step 520 the result is stored in the stencil register for the associated pixel. Then, the process ends at step 516 (to be repeated for other pixels).

The foregoing has described a method of effectively clearing the stencil registers using surrogate stencil clearing. After some number of surrogate stencil buffer clearing an actual hardware clear is performed, allowing a new default clear value to be used. If the value of the hardware counter does not match the value in the stencil clear group 210 it is known that the associated pixel was not impacted by the ongoing operation. In that case, surrogate stencil buffer clearing is used by using the surrogate clear value. But, if the values match, the content of the particular stencil register set during step 512 is used.

The foregoing has described a surrogate stencil buffer clear method that operated on the unstated assumption that the width of the clear group 302, and thus that of the surrogate clear group 304, are fixed. In many applications that may be suitable, e.g., in applications where the stencil control register 300 can be hardwired with fixed clear group 302 and surrogate clear group 304 sizes. However, greater flexibility can be achieved by allowing either software or a designer to set the widths of the clear group 302 and the surrogate clear group 304. Since those widths also sets the partition 208, the widths of the stencil clear group 210 and the stencil value group 212 are also set.

Figure 6:
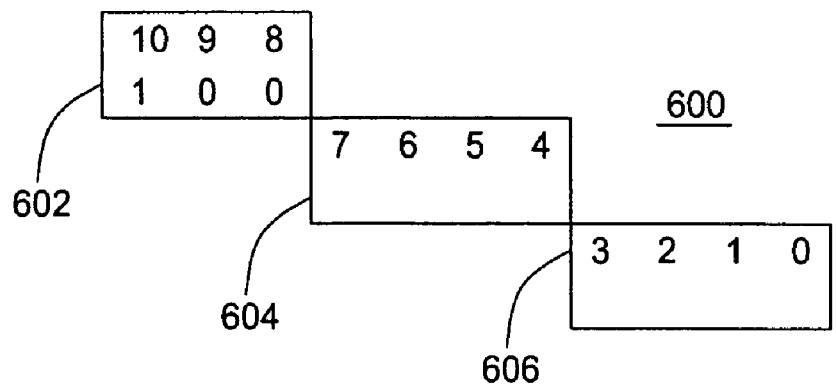
FIG. 6 conceptually illustrates a hardware register that includes a bit assignment register that controls the organization of the hardware register and the stencil registers.

FIG. 6 illustrates a stencil control register 600 that enables controlled configuration of a surrogate stencil buffer clearing system. The stencil control register 600 differs from the stencil control register 300 by the inclusion of a configuration group 602. FIG. 6 shows a configuration group 602 containing the binary value 4. That binary value configures the width of the clear group 604 to have 4 bits, which then configures the surrogate clear group 304 to have 4 bits. This also sets the partition 208 such that the stencil cleared group 210 has 4 bits and the stencil value group 212 to have 4 bits.

Figure 7:
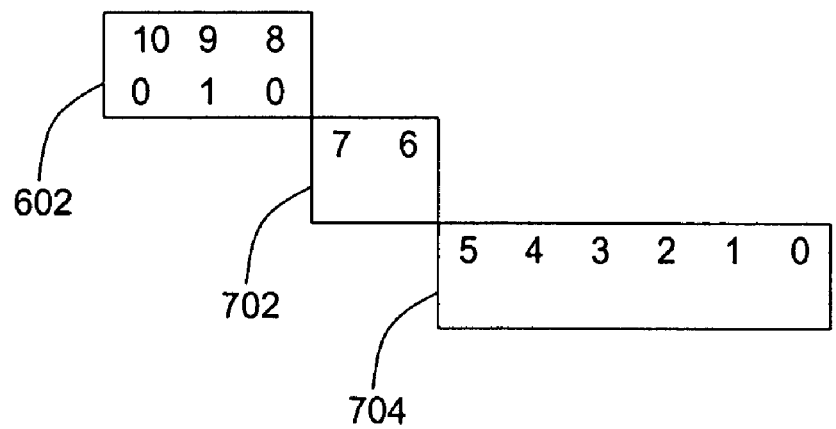
FIG. 7 conceptually illustrates the hardware register of FIG. 6 that has a different value in the bit assignment register.

FIG. 7 illustrates a stencil control register 600 in which the configuration group 602 contains the binary value 2. This sets the width of a clear group 702 to 2 bits, which then sets the surrogate clear group 704 to be 6 bits wide. This is also used to set the partition 208 such that the stencil clear group 210 is 2 bits wide while the stencil value group 212 is 6 bits wide. Thus, the configuration group 602 enables the surrogate stencil buffer clearing system to be easily configured.

Figure 8:
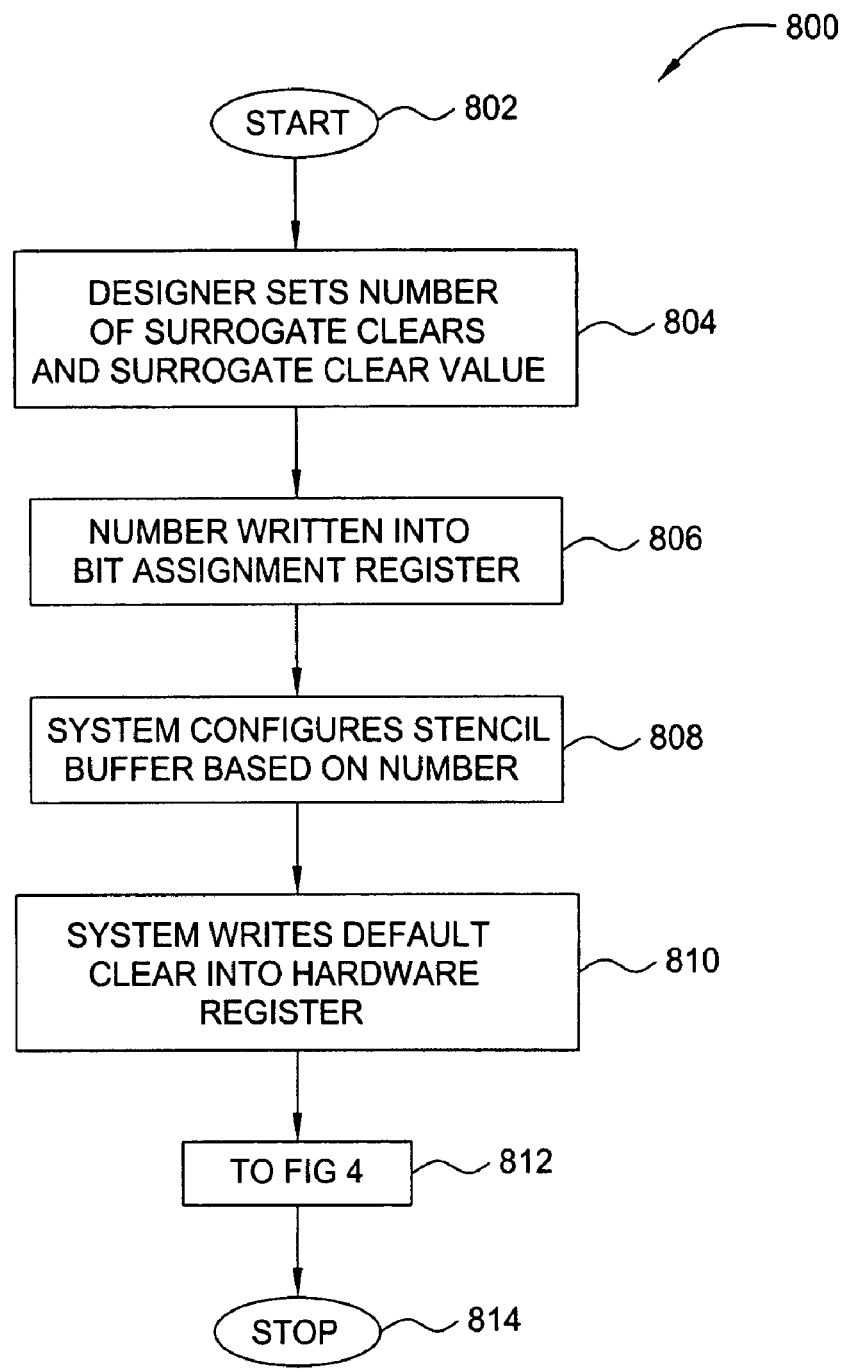
FIG. 8 illustrates a method of controlling the configuration of the hardware register and the stencil registers.

FIG. 8 illustrates a method of setting the value in the configuration group 602. The method 800 starts at step 802 and proceeds to step 804 where a designer sets the number of surrogate clears to be used and a default clear value in the surrogate clear group 304. In step 806 the number of surrogate clears is analyzed to determined the correct number to enter into the configuration group 602: that number is then entered. For example, if 6 surrogate clears are to be performed before an actual clear, the binary number 3 is entered into the configuration group 602 since a clear group 604 that is at least three bits is required. Then, at step 808 the system automatically configures the stencil registers based on the number entered at step 806. That is, the partition 208 is set such that the number written into the clear group 604 can be written into the stencil cleared group 210. Then, at step 810, the system writes the default clear value into the surrogate clear group 606. Then at step 812 the method calls the method 400. Finally, the method 800 stops at step 814.

Controlling the operations illustrated in FIGS. 6-8 can be performed using standardized application programming interfaces (APIs) such as an OpenGL API. Such is particularly beneficial in that in enables a user to control surrogate clearing operations. Indeed, setting surrogate clear values using APIs can be highly useful in tailoring stencil operations to a given application, system, or user.

The foregoing provides for an inexpensive hardware mechanism for amortizing the time cost of multiple stencil-only clears by using a client-specified number of upper bits of the stencil buffer to maintain a per-pixel stencil clear generation value (also called a clear tag). While the foregoing has focused in on the idea of surrogate stencil buffer clearing an equally valid view is of using the upper bits of each stencil register to encode a stencil generation that indicates in which generation the stencil register value was last written. If a stencil value is read and its encoded stencil generation does NOT match the current stencil generation, the stencil value is substituted with a "reset" stencil value meant to indicate the value that the stencil buffer would have been cleared to if the last change of stencil generation had actually been a clear of the entire stencil buffer. When a stencil value is written, its upper bits are overridden to be the current stencil generation value so subsequent reads in the same stencil generation properly return the updated lower bits.

A client specifying 3 bits to encode the stencil generation, say by using an API, every 7 of 8 clears of the entire stencil buffer can be performed with a state update of the current stencil generation rather than an actual update of all the frame buffer's stencil values. Still, every 8th clear must be an actual stencil clear. The net effect is that the aggregate time cost of stencil clears is reduced by a factor of $1/(2^n)$ where n is the number of bits devoted to the stencil generation.

Some applications of the present invention will specify two pieces of state: 1) the number of upper stencil bits, n, assigned to maintain the stencil generation in each stencil value within the stencil buffer, and 2) a stencil generation value that packs the current generation value and a reset value into a single integer values. The upper n bits of the stencil generation value specify the current stencil generation while the lower s-min (n,s) bits specify the current stencil generation reset value, where s is the number of bitplanes in the stencil buffer and n is the current stencil generation bits value.

If zero bits are assigned to the stencil generation encoding, then the stencil buffer operates in the conventional manner.

Hardware implementations of the present invention can be simple without encumbering operations. In fact, two distinct OpenGL rendering contexts can render to the same frame buffer using different stencil generation states. This avoids trying to coordinate two different contexts into maintaining the same interpretation of the stencil buffer. Different contexts are simply view the stencil buffer values differently based on their own stencil generation state.

The principles of the present invention provide for new, useful, and non-obvious methods and apparatuses for effectively clearing a stencil register. It should be noted that while the use of surrogate stencil clearing has been described in the context of a system in which surrogate stencil clearing was always used, this is not required. For example, a system that selectively operates in a normal mode, that is, without surrogate stencil clearing, and when in a surrogate mode that uses surrogate stencil clearing is in full accord with the principles of the present invention. While various embodiments have been described above, it should be understood that they have been presented by way of example only, and not limitation. Thus, the breadth and scope of a preferred embodiment should not be limited by any of the above described exemplary embodiments, but should be defined in accordance with the following claims and their equivalents.

While the foregoing is directed to embodiments of the present invention, other and further embodiments of the invention may be devised without departing from the basic scope thereof, and the scope thereof is determined by the claims that follow.

The invention claimed is:

1. A method of surrogate stencil buffer clearing comprising the steps of:
   (a) actually clearing stencil registers of a stencil buffer by writing a predetermined default value into each of the stencil registers;
   (b) setting a counter value;
   (c) setting a surrogate clear value;
   (d) determining which of the stencil registers are impacted by a stencil operation and determining desired stencil register values;
   (e) increasing the counter value;
   (f) writing the increased counter value and desired stencil register values into the impacted stencil registers;
   (g) performing stencil register operations using the desired stencil register value of each stencil register holding the increased counter value and using the surrogate clear value for each stencil register that does not hold the increased counter value.

2. The method of claim 1 wherein setting the surrogate gate clear value and setting the counter value are performed by an application programming interface (API).

3. The method of claim 2 wherein the size of the counter is set by the application programming interface (API).

4. The method of claim 1 further including the step of setting a size of the counter used to generate the counter value.

5. The method of claim 4 wherein setting the size is performed by an operator entering a configuration value.

6. The method of claim 4 wherein setting the size is performed by a program setting a configuration value.

7. The method of claim 1, wherein step (g) includes determining if each stencil register contains the increased counter value.

8. The method of claim 7 wherein determining if each stencil register contains the current counter value is performed by comparing predetermined bits of each stencil register with the counter.

9. A computer readable medium for storing instructions that cause a computer system having a graphics system with a stencil buffer to perform the operations of:
(a) clearing all stencil registers by writing a predetermined default value into each of the stencil registers;
(b) setting a counter value;
(c) setting a surrogate clear value;
(d) determining which of the stencil registers are impacted by stencil operations and determining the desired stencil register values;
(e) incrementing the counter value;
(f) writing the incremented counter value and the desired stencil register values into the impacted stencil registers;
(g) performing stencil operations using the stencil register value of each stencil register holding the incremented counter value while using the surrogate clear value for each stencil register that does not hold the incremented counter value.

10. The computer readable medium of claim 9 further including the operation of determining if the counter has reached a predetermined threshold.

11. The computer readable medium of claim 10 further including returning to operation (a) if the counter reached the predetermined threshold.

12. The computer readable medium of claim 10 further including returning to step (d) if the counter has not reached the predetermined value.

13. The computer readable medium of claim 9 further including setting the size of the counter.

14. The computer readable medium of claim 13 wherein setting the size is performed by an operator entering a configuration value.

15. The computer readable medium of claim 13 wherein an application programming interface (API) sets the size of the counter.

16. The computer readable medium of claim 9, wherein operation (g) includes determining if each stencil register contains the current counter value.

17. The computer readable medium of claim 16 wherein determining if each stencil register contains the current counter value is performed by comparing predetermined bits of each stencil register with the counter.

* * * * *